(12) United States Patent
Taniguchi et al.

(10) Patent No.: US 8,511,829 B2
(45) Date of Patent: Aug. 20, 2013

(54) IMAGE PROCESSING APPARATUS, PROJECTION DISPLAY APPARATUS, VIDEO DISPLAY SYSTEM, IMAGE PROCESSING METHOD, AND COMPUTER READABLE STORAGE MEDIUM

(75) Inventors: Mitsuru Taniguchi, Matsumoto (JP); Yuki Yamabe, Nishinomiya (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 13/035,070

(22) Filed: Feb. 25, 2011

(65) Prior Publication Data
US 2011/0211120 A1    Sep. 1, 2011

(30) Foreign Application Priority Data
Mar. 1, 2010 (JP) ................................. 2010-043978

(51) Int. Cl.
*G03B 21/26* (2006.01)
*G06K 9/34* (2006.01)
*G06K 9/46* (2006.01)
*G09G 5/02* (2006.01)

(52) U.S. Cl.
USPC ............. 353/30; 353/121; 382/173; 382/194; 345/581; 345/614; 345/698; 345/3.3

(58) Field of Classification Search
USPC ........... 353/30, 121; 382/173, 194; 345/581, 345/614, 698, 3.3
See application file for complete search history.

(56) References Cited

U.S. PATENT DOCUMENTS

| | | | | |
|---|---|---|---|---|
| 3,573,789 A | * | 4/1971 | Sharp et al. | 345/698 |
| 2007/0258661 A1 | * | 11/2007 | Koshi et al. | 382/298 |
| 2009/0110276 A1 | | 4/2009 | Lee et al. | |
| 2010/0177108 A1 | * | 7/2010 | Fukuchi | 345/581 |

FOREIGN PATENT DOCUMENTS

| | | |
|---|---|---|
| JP | 2009-111969 | 5/2009 |
| JP | 2009-264631 | 11/2009 |
| JP | 2009-264635 | 11/2009 |
| JP | 2010-161677 | 7/2010 |

* cited by examiner

*Primary Examiner* — Georgia Y Epps
*Assistant Examiner* — Magda Cruz
(74) *Attorney, Agent, or Firm* — Workman Nydegger

(57) ABSTRACT

An image processing apparatus processes image data corresponding to a display image. The image processing apparatus includes M image processing sections which have a function of processing image data of M (where M is an integer equal to or greater than 2) images segmented from the image and an image processing control section which, when an image corresponding to input image data is an image which has a resolution being of size to be processable by N (where N is an integer equal to or smaller than M−1) image processing sections, causes L image processing sections from among the M image processing sections to process image data corresponding to L (where L is an integer equal to or greater than N+1 and equal to or smaller than M) partial images segmented from image data.

17 Claims, 13 Drawing Sheets

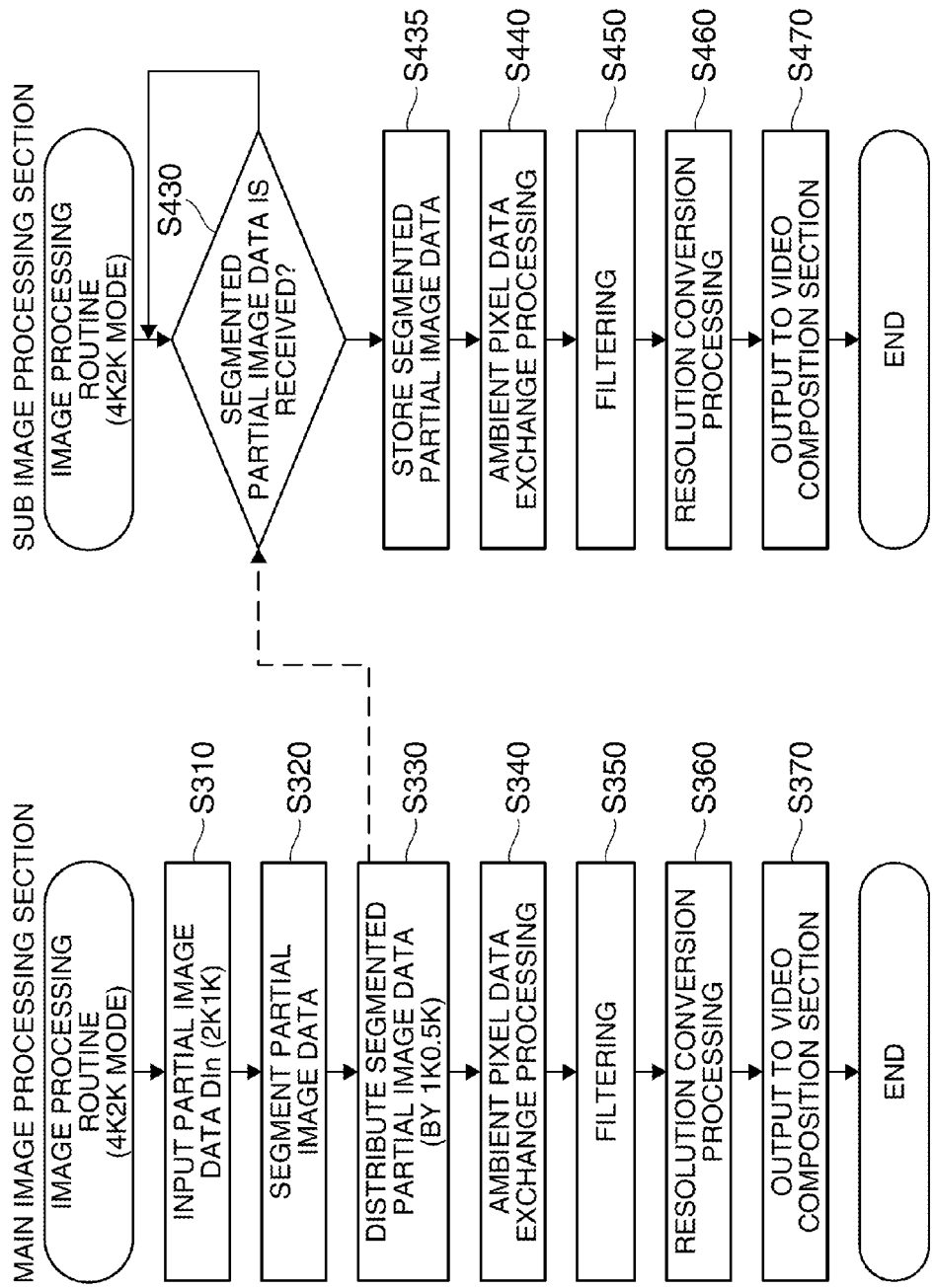

IMAGE PROCESSING APPARATUS, PROJECTION DISPLAY APPARATUS, VIDEO DISPLAY SYSTEM, IMAGE PROCESSING METHOD, AND COMPUTER READABLE STORAGE MEDIUM

The entire disclosure of Japanese Patent Application No. 2010-43978, filed Mar. 1, 2010 is expressly incorporated by reference herein.

BACKGROUND

1. Technical Field

The present invention relates to an image processing technique which segments image data corresponding to a display image into multiple pieces of image data and processes multiple pieces of image data.

2. Related Art

In recent years, a video processing apparatus which is mounted in a video display instrument, such as a high-resolution projector, a liquid crystal television, or a plasma television, segments image data corresponding to an input display image (hereinafter, referred to as display image data) into multiple pieces of image data and processes multiple pieces of image data in parallel. Specifically, a plurality of image processing sections, each of which processes segmented image data (hereinafter, referred to as partial image data), process partial image data in parallel. Example of such a technique is described in JP-A-2009-111969.

However, in the case of a video processing apparatus which uses a method of segmenting multiple pieces of image data and processing multiple pieces of image data in parallel, regardless of whether input display image data has high resolution or low resolution, in general, the same data quantity of image data is processed by the single image processing section. That is, high-resolution display image data is processed by a large number of image processing sections, and when low-resolution display image data is input, a small number of image processing sections are used to process low-resolution display image data depending on the ratio of lowering of resolution. In processing low-resolution image data, in addition to image processing of high-resolution image data, resolution conversion processing (for example, pixel interpolation by bi-cubic convolution or bilinear interpolation) is performed. As a result, in processing low-resolution image data, there is a problem in that a heavy load is imposed on the single image processing section.

SUMMARY

An advantage of some aspects of the invention is to solve at least a part of the problems described above and the invention can be implemented as the following aspects or application examples.

An image processing apparatus in one application example processes image data corresponding to a display image. The image processing apparatus includes an input section which is configured to input at least image data corresponding to an image having a reference resolution P which is a resolution as a reference, the resolution representing the number of constituent pixels, M image processing sections which have a function of processing image data of M (where M is an integer equal to or greater than 2) images segmented from the image having the reference resolution P, an image processing control section which, when an image corresponding to input image data is the image having the reference resolution P, causes the M image processing sections to process image data corresponding to the M partial images segmented from image data and, when an image corresponding to input image data is an image which has a resolution Q lower than the reference resolution P and is of size to be processable by N (where N is an integer equal to or smaller than M−1) image processing sections, causes L image processing sections from among the M image processing sections to process image data corresponding to L (where L is an integer equal to or greater than N+1 and equal to or smaller than M) partial images segmented from image data, and an image composition section which reconstructs the display image on the basis of image data corresponding to the partial images subjected to image processing by the M or L image processing sections.

With this image processing apparatus, when image data corresponding to the display image having the resolution Q lower than the reference resolution P is processed by the image processing sections as partial image data, instead of decreasing the number of image processing sections for processing depending on the ratio of lowering of resolution, a large number of image processing sections, specifically, L, that is, "N+1" or more image processing sections process image data for the ratio of lowering of resolution.

Usually, if the resolution of image data corresponding to a display image is lowered, it is necessary to perform processing according to the lowering of resolution. For example, one of the processing is resolution conversion processing. With regard to resolution conversion, image interpolation processing by bilinear interpolation or bi-cubic convolution is performed. If the number of image processing sections for processing decreases depending on the lowering of resolution, a heavy processing load is imposed on the single image processing section compared to a case where the reference resolution P is processed. That is, the resolution conversion processing is performed in addition to image processing which is performed by the single image processing section in the case of the reference resolution P.

Meanwhile, in the image processing apparatus according to the application example of the invention, a large number of image processing sections, that is, "N+1" or more image processing sections perform image processing for the ratio of lowering of resolution. Thus, it is possible to reduce a load on the single image processing section compared to an image processing apparatus in which the number of image processing sections for processing decreases depending on the ratio of lowering of resolution. Therefore, it is possible to reduce the performance of the single image processing section and consequently to achieve reduction in cost.

In one application example, a plurality of input sections may be provided to input image data corresponding to the display image as multiple pieces of segmented image data.

With this image processing apparatus, a plurality of input sections are provided, such that image data can be input in parallel from a plurality of input sections in a segmented form.

In one application example, the L image processing sections may include a first image processing section which, before the image processing, receives image data input by the input section, segments received image data into a predetermined number of pieces of image data, reserves at least one piece of segmented image data for use in processing, and distributes unreserved segmented image data to other image processing sections, and a second image processing section which receives image data distributed by the first image processing section.

With this image processing apparatus, when a plurality of image processing sections process input image data, the first image processing section receives and segments image data, and distributes segmented image data to the second image processing section. Therefore, when the input section inputs image data, it is not necessary to take the form of input such that image data is input to the respective image processing sections.

In one application example, the second image processing section may segment image data received from the first processing section into a predetermined number of pieces of image data, reserve at least one piece of segmented image data for use in processing, and distribute unreserved segmented image data to image processing sections other than the first and second image processing sections, and the L image processing sections may include a third image processing section which receives image data distributed by the second image processing section.

With this image processing apparatus, the second image processing section segments received image data and distributes segmented image data to the third image processing section. Therefore, when the input section inputs image data, it is not necessary to take the form of input such that image data is input to the respective image processing sections.

In one application example, M and L may be the same number.

With this image processing apparatus, even when the resolution of input image data is lowered, image data is processed by the M image processing sections.

In one application example, the reference resolution P may be "8K4K".

This image processing apparatus copes with so-called super high-vision image data.

A projection display apparatus in one application example projects a projected image on a projection surface on the basis of image data corresponding to a display image. The projection display apparatus includes the above-described image processing apparatus.

With this projection display apparatus, the above-described image processing apparatus is provided, reducing a load of processing on the single image processing section. Therefore, it is possible to reduce the performance of the single image processing section in the projection display apparatus and consequently achieving reduction in cost.

A video display system in one application example includes a video display apparatus which includes the above-described image processing apparatus and displays an image on the basis of image data corresponding to a display image, and a storage which stores image data corresponding to the display image and inputs image data corresponding to the display image to the video display apparatus.

With this video display system, the video display apparatus includes the above-described image processing apparatus, reducing the performance of the single image processing section in the video display apparatus and consequently achieving reduction in cost.

An image processing method in one application example processes image data corresponding to a display image and processes at least image data corresponding to an image having a reference resolution P which is a resolution as a reference, the resolution representing the number of constituent pixels. The image processing method includes, when image data corresponding to the input display image is the image having the reference resolution P, segmenting image data into image data corresponding to M (where M is an integer equal to or greater than 2) partial images having a resolution R and processing segmented image data in parallel, when image data corresponding to the input display image has a resolution Q lower than the reference resolution P, and one of N (where N is an integer equal to or smaller than M−1) segmented partial images has a resolution equal to or lower than a resolution R, segmenting image data into L (where L is an integer equal to or greater than N+1 and equal to or smaller than M) pieces of image data and processing image data corresponding to the partial images in parallel, and reconstructing the display image on the basis of processed image data corresponding to the M or L partial images.

With this image processing method, in processing image data corresponding to the display image having the resolution Q lower than the reference resolution P, instead of decreasing the number of pieces of segmented image data depending on the ratio of lowering of resolution, image data is segmented into a large number of pieces of image data, specifically, L, that is, "N+1" or more pieces of image data for the ratio of lowering of resolution and segmented image data is processed in parallel. Therefore, while image processing is accompanied by resolution conversion, it is possible to reduce a load of processing a single partial image.

A computer readable storage medium storing a computer program in one application example causes a computer to realize an image processing function of processing image data corresponding to a display image and processing at least image data corresponding to an image having a reference resolution P which is a resolution as a reference, the resolution representing the number of constituent pixels. The computer program causes the computer to execute, when image data corresponding to the input display image is the image having the reference resolution P, segmenting image data into image data corresponding to M (where M is an integer equal to or greater than 2) partial images having a resolution R and processing segmented image data in parallel, when image data corresponding to the input display image has a resolution Q lower than the reference resolution P, and one of N (where N is an integer equal to or smaller than M−1) segmented partial images has a resolution equal to or lower than a resolution R, segmenting image data into L (where L is an integer equal to or greater than N+1 and equal to or smaller than M) pieces of image data and processing image data corresponding to the partial images in parallel, and reconstructing the display image on the basis of processed image data corresponding to the M or L partial images.

With this computer readable storage medium, in processing image data corresponding to the display image having the resolution Q lower than the reference resolution P, instead of decreasing the number of pieces of segmented image data depending on the ratio of lowering of resolution, the computer realizes the function of segmenting image data into a large number of pieces of image data, specifically, L, that is, "N+1" or more pieces of image data for the ratio of lowering of resolution and processing segmented image data in parallel. Therefore, while image processing is accompanied by resolution conversion, it is possible to reduce a load of processing a single partial image.

BRIEF DESCRIPTION OF THE DRAWINGS

The invention will be described with reference to the accompanying drawings, wherein like numbers reference like elements.

FIGS. 11A and 11B are flowcharts illustrating the flow of image processing.

DESCRIPTION OF EXEMPLARY EMBODIMENT

An embodiment of the invention will be described on the basis of Examples.

A First Example

A1 Configuration of Video Display System

Figure 1:
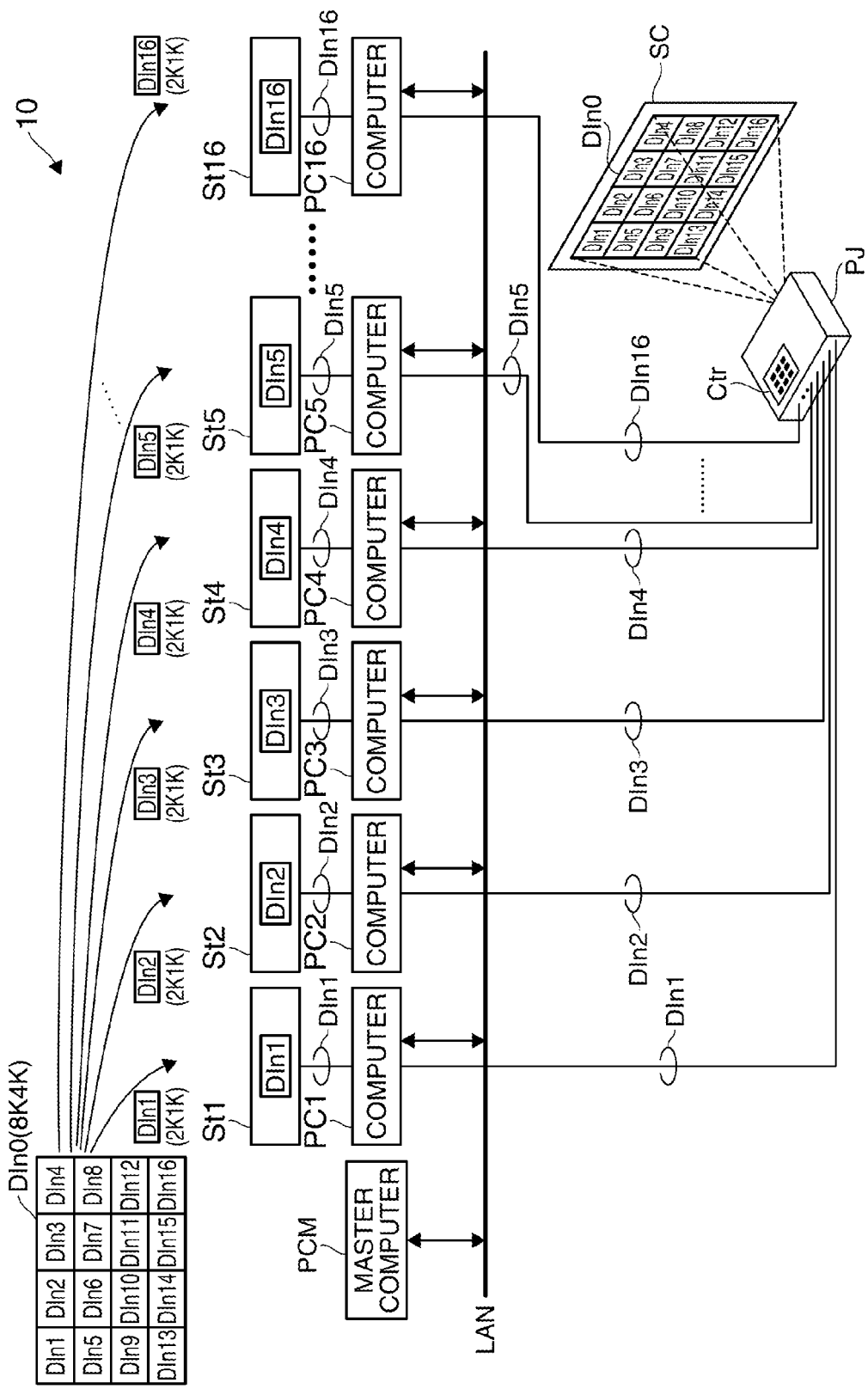
FIG. 1 is an explanatory view illustrating a video display system.

FIG. 1 is an explanatory view illustrating a video display system 10 of First Example. The video display system 10 includes a projector PJ which projects and displays a video, a screen SC which displays the video projected by the projector PJ, computers PC1 to PC16, video storages St1 to St16 serving as a storage device, and a master computer PCM which controls the data output from the computers PC1 to PC16. The projector PJ is connected to the computers PC1 to PC16 through a data transmission cable, receives video data having a plurality of types of resolution, performs image processing, and projects and displays a display image on the screen SC. The computers PC1 to PC16 are connected to the master computer PCM through a LAN (Local Area Network) cable. The video storages St1 to St16 are connected to the computers PC1 to PC16 through a data communication cable.

As shown in FIG. 1, each of the video storages St1 to St16 stores 16 pieces of partial image data DIn1 to DIn16 in total obtained by quartering display image data DIn0 for one screen of a video projected and displayed on the screen SC by the projector PJ in the horizontal and vertical directions by the number of frames of the video. DIn1 to DIn16 are image data of size equivalent to so-called full HD. Image data of this size is generally called "2K1K" (resolution 1920×1080). The term "resolution" used herein means the number of pixels constituting image data corresponding to one image. In the case of the video display system 10, display image data DIn0 includes 2K1K partial image data arranged by four in the vertical and horizontal directions. Display image data DIn0 is generally image data having a resolution of called "8K4K".

Images corresponding to partial image data DIn1 to DIn16 are processed by a video processing apparatus 100 in the projector PJ described below. Image data processed by the video processing apparatus 100 is projected and displayed as partial image data DIn1 to DIn16 on the screen SC through the projector PJ, such that display image data DIn0 which is the image for one screen is displayed on the screen SC. Partial image data DIn1 to DIn16 are synchronously displayed on the screen SC continuously in a time series manner, such that a video as a motion image or a still image is displayed on the screen SC.

The computers PC1 to PC16 receive a synchronization signal from the master computer PCM through a LAN, synchronously read partial image data DIn1 to DIn16 from the video storages St1 to St16, and input partial image data DIn1 to DIn16 to the projector PJ. The master computer PCM is a computer for controlling the read timing at which the computers PC1 to PC16 read partial image data DIn1 to DIn16 from the video storages St1 to St16. If a user manipulates the master computer PCM to issue an instruction to start video display, the master computer PCM outputs a synchronization signal to the respective computers PC1 to PC16, and then partial image data DIn1 to DIn16 are started to be read from the video storages St1 to St16. In this example, partial image data DIn1 to DIn16 are digital data regardless of whether partial image data DIn1 to DIn16 are stored in the video storage or transmitted to the projector PJ.

Figure 2:
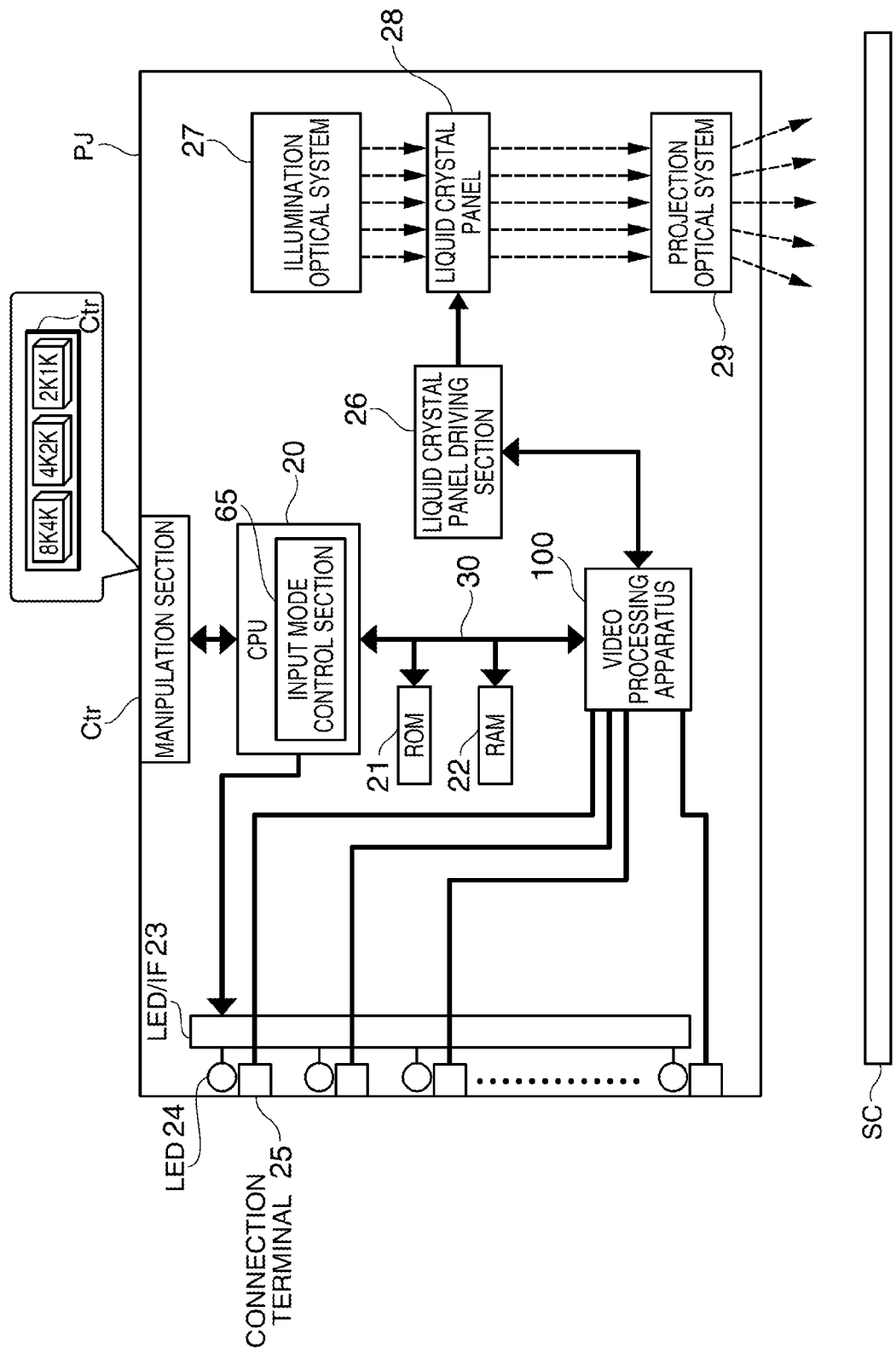
FIG. 2 is an explanatory view illustrating the configuration of a projector.

Next, the configuration of the projector PJ will be described. FIG. 2 is an explanatory view illustrating the configuration of the projector PJ. The projector PJ includes a CPU 20, a ROM 21, a RAM 22, an LED/IF 23, an LED 24, connection terminals 25, a liquid crystal panel driving section 26, an illumination optical system 27, a liquid crystal panel 28, a projection optical system 29, a video processing apparatus 100, a manipulation section Ctr, and an internal bus 30. The CPU 20 has a control function of performing overall control of the projector PJ. In this example, the CPU 20 includes an input mode control section 65 in addition to the control function of performing overall control of the projector PJ. The manipulation section Ctr includes a panel for selecting "8K4K mode" which is set when input display image data DIn0 is 8K4K, "4K2K mode" which is set when input display image data DIn0 is 4K2K, and "2K1K mode" which is set when display image data DIn0 is 2K1K. These modes are called "input mode". The user sets the input mode through the manipulation section Ctr in accordance with the resolution of input display image data DIn0. In the case of the video display system 10, the user sets "8K4K mode" as the input mode.

The connection terminals 25 are terminals which connect the computers PC1 to PC16 and the projector PJ to each other and receive partial image data DIn from the computers PC1 to PC16. The video processing apparatus 100 processes partial image data DIn input through the connection terminals 25 and outputs processed video data to the liquid crystal panel driving section 26. The liquid crystal panel driving section 26 drives the liquid crystal panel 28 on the basis of input video data. The liquid crystal panel 28 is a transmissive liquid crystal panel which visualizes a generated signal by the liquid crystal panel driving section 26, and modulates light irradiated from the illumination optical system 27 to emit light (projection light) necessary for projection toward the screen SC. The liquid crystal panel 28 may be a light valve using a DMD (Digital Micromirror Device, Registered Trademark), instead of a transmissive liquid crystal panel. The projection optical system 29 includes a projection lens or the like (not shown) which projects light irradiated from the illumination optical system 27 through the liquid crystal panel 28 on the screen SC on a magnified scale.

Figure 3:
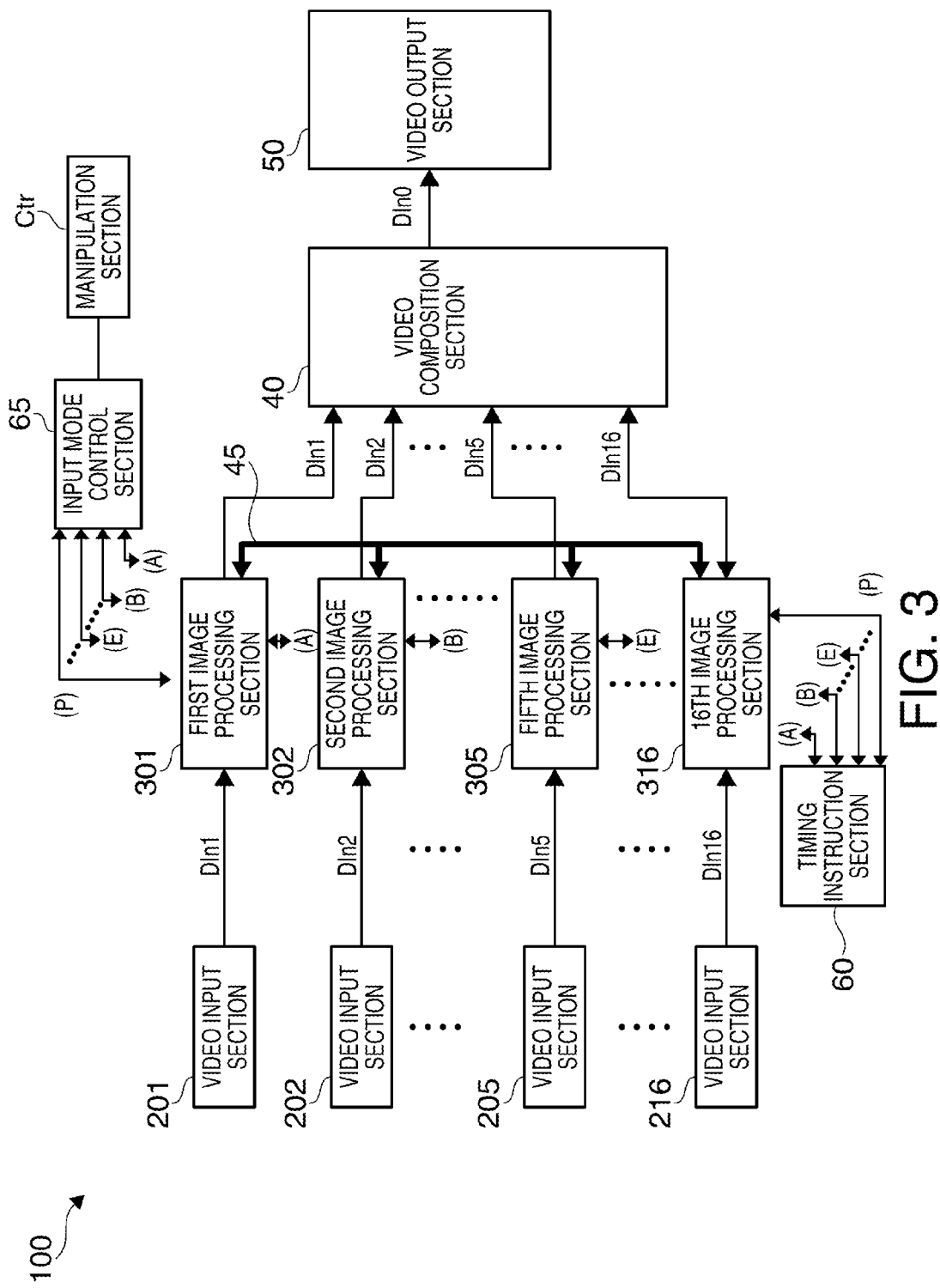
FIG. 3 is an explanatory view showing the configuration of a video processing apparatus.

Next, the configuration of the video processing apparatus 100 in the projector PJ will be described. FIG. 3 is an explanatory view showing the configuration of the video processing apparatus 100. The video processing apparatus 100 includes video input sections 201 to 216 which input partial image data DIn1 to DIn16 input from the computers PC1 to PC16 through the connection terminals 25 to the video processing apparatus 100, first image processing section 301 to 16th image processing section 316 as 16 image processing sections which process input partial image data DIn1 to DIn16 in parallel, a video composition section 40 which composes image data DIn1 to DIn16 corresponding to partial image data processed by the image processing sections in parallel to generate image data of one screen, a video output section 50 which outputs composed display image data DIn0 as an output signal to the liquid crystal panel driving section 26, and a timing instruction section 60. The image processing sections 301 to 316 are connected to each other through a data exchange bus 45.

The 16 image processing sections 301 to 316 receive an instruction from the timing instruction section 60 and exchange ambient pixel data necessary for image processing in the image processing sections 301 to 316 with each other. Ambient pixel data will be described below. The image processing sections perform processing with the lower two-digit number of the reference numeral attached to each image processing section associated with the number of the reference numeral attached to each piece of partial image data such that the first image processing section 301 processes DIn1 from among segmented partial image data DIn1 to DIn16 and the second image processing section 302 processes DIn2. The image processing sections receive information (hereinafter, also referred to as input mode signals) regarding the input mode set by the user using the manipulation section Ctr through the input mode control section 65.

The timing instruction section 60 transmits a synchronization output signal for synchronously outputting partial image data DIn processed by the respective image processing sections from the respective image processing sections to the video composition section 40 to the image processing sections 301 to 316. The synchronization output signal is generated on the basis of, for example, a dot clock or a synchronization signal, such as a horizontal synchronization signal and a vertical synchronization signal, and is transmitted to the image processing sections 301 to 316. In the following description, the configuration of the image processing section will be described focusing on the configuration of the sixth image processing section 306.

Figure 4:
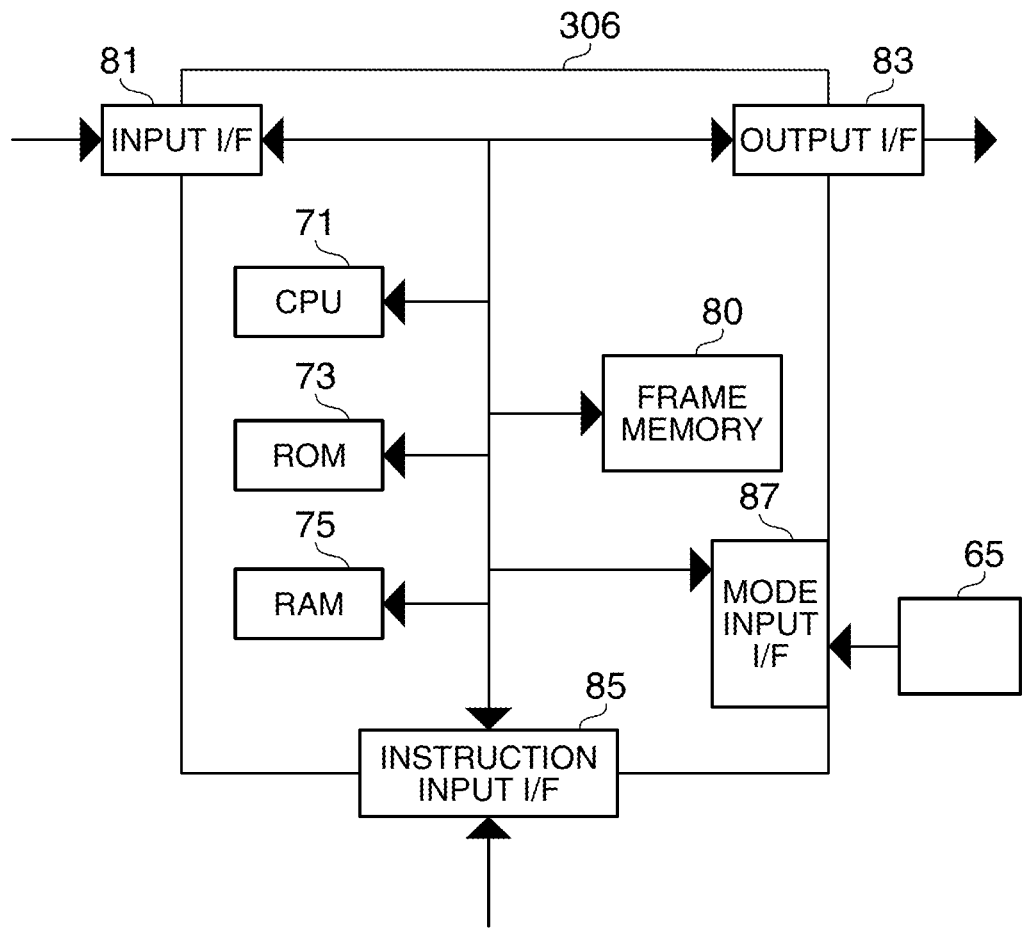
FIG. 4 is a block diagram showing the internal configuration of a sixth image processing section.

FIG. 4 is a block diagram showing the internal configuration of the sixth image processing section 306. The sixth image processing section 306 includes a CPU 71 which has a function as a digital signal processor (DSP), a ROM 73 which stores an operating program or the like, a RAM 75 which is used as a work area, a frame memory 80 which has a storage capacity slightly greater than image data segmented from display image data DIn0, that is, partial image data DIn6, an input interface 81 which receives partial image data DIn6 from the video storage St6, an output interface 83 which outputs partial image data DIn6 to the video composition section 40, an instruction input interface 85 which receives a timing signal from the timing instruction section 60, and a mode input interface 87 which receives an input mode signal from the input mode control section 65. The CPU 71 is an exclusive-use processor which controls the overall operation of the sixth image processing section 306 and, in particular, can access the frame memory 80 at high speed to perform predetermined image processing (filtering). The function of the CPU 71 may be realized by an FPGA (Field Programmable Array) or an LSI for image processing only.

Figure 5:
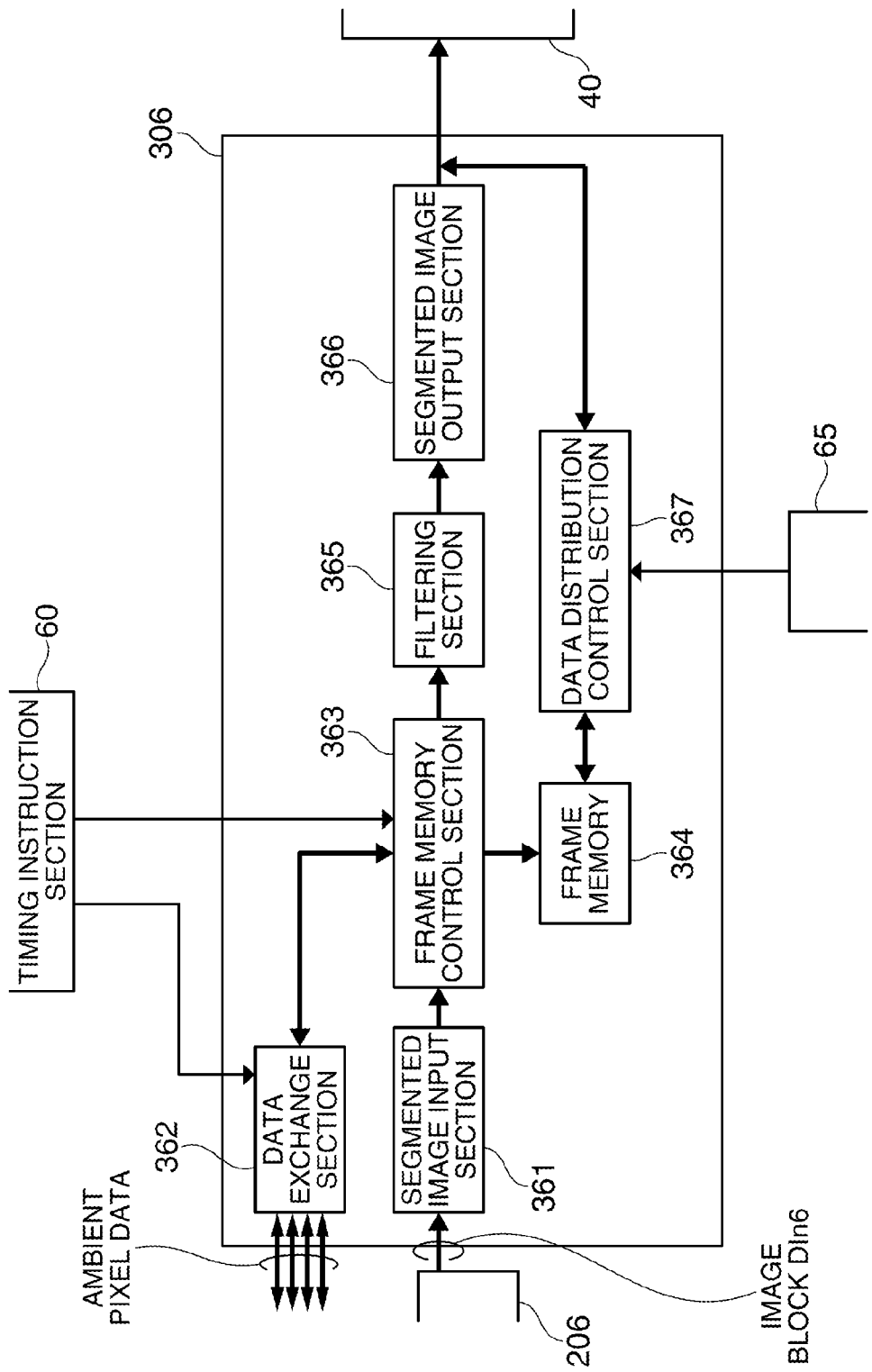
FIG. 5 is a block diagram schematically showing processing in the sixth image processing section.

Next, the functional configuration of each image processing section will be described. FIG. 5 is a block diagram schematically showing processing in the sixth image processing section 306. The sixth image processing section 306 functionally includes a segmented video input section 361, a data exchange section 362, a frame memory control section 363, a frame memory 364, a filtering section 365, a segmented image output section 366, and a data distribution control section 367. Actually, the operation of each block is realized when the CPU 71 executes a predetermined program. The details of the respective functional sections will be described below.

A2 Video Processing

Figure 6:
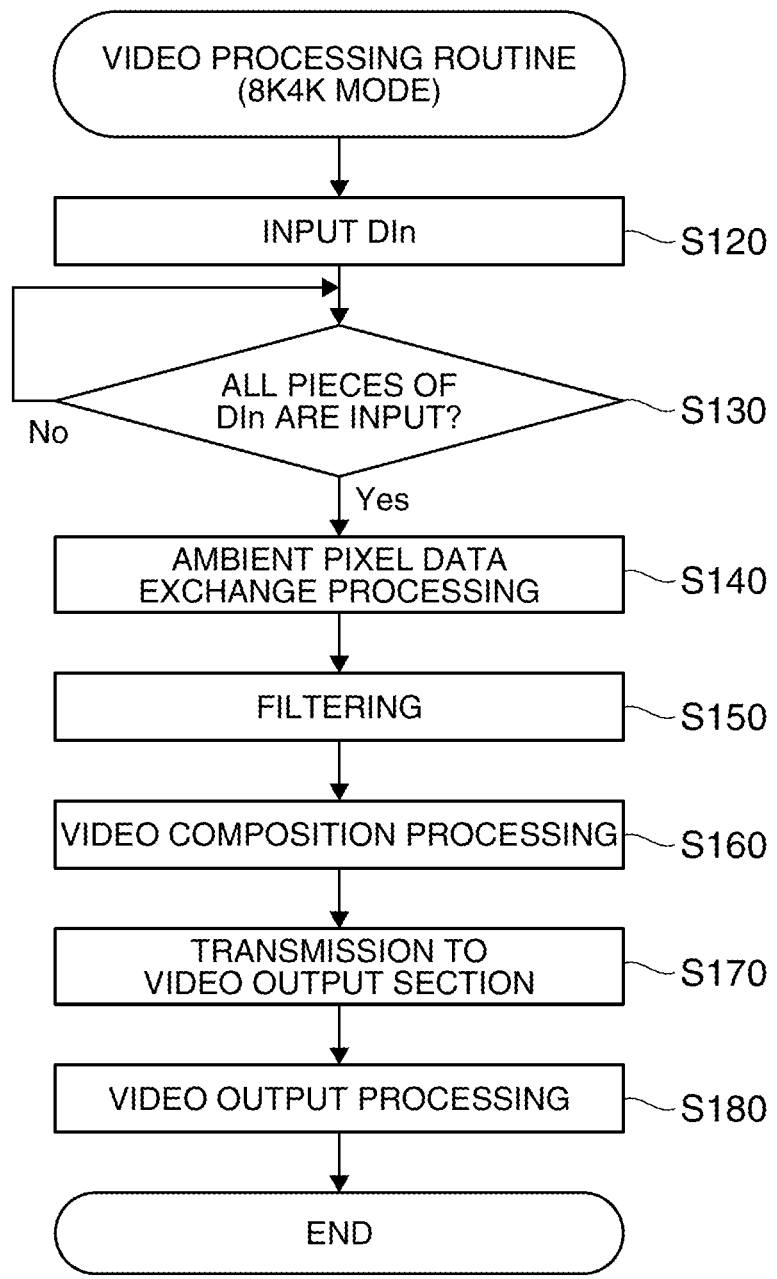
FIG. 6 is an explanatory view schematically showing the flow of video processing in the video processing apparatus.

Next, description will be provided as to video processing in the 8K4K mode by the video processing apparatus 100. FIG. 6 is an explanatory view schematically showing the flow of video processing in the video processing apparatus 100. The video processing starts when partial image data DIn1 to DIn16 are input from the video storages St1 to St16 (see FIG. 1) to the video input sections 201 to 216.

Partial image data DIn1 to DIn16 are respectively input from the video input sections 201 to 216 to the image processing sections 301 to 316 through the segmented video input sections (see FIG. 4) (Step S120). The frame memory control section of each image processing section stores input partial image data DIn in the frame memory. If the storage of partial image data DIn in the frame memory has been completed, the frame memory control section notifies the timing instruction section 60 of the storage having been completed. The timing instruction section 60 analyzes the situation of the storage of partial image data DIn in the respective image processing sections 301 to 316 and, when it is determined that the input of all pieces of partial image data DIn1 to DIn16 to the image processing sections has been completed (Step S130: Yes), instructs the data exchange sections of the respective image processing sections to start data exchange. If the instruction to start data exchange is received from the timing instruction section 60, each data exchange section performs ambient pixel data exchange processing for exchanging ambient pixel data, which is necessary for processing partial image data to be processed by the corresponding image processing section, with a data exchange section in a predetermined image processing section (Step S140). The ambient pixel data exchange processing will be described below in detail. From the viewpoint that image data is sequentially received, data exchange may be sequentially started from data exchange between the image processing sections which can perform data exchange. Meanwhile, in this example, as shown in Step S130, for ease of understanding of the invention, data exchange is performed after all the first to 16th image processing sections 301 to 316 have received image data.

If the data exchange sections of the respective image processing sections have ended the exchange of ambient pixel data, each frame memory control section outputs partial image data DIn stored in the frame memory and ambient pixel data acquired by the ambient pixel data exchange processing to the corresponding filtering section, and the filtering section performs filtering using the two pieces of data (Step S150). If the filtering has ended, the filtering section outputs processed data to the video composition section 40 through the corresponding segmented image output section. At this time, the segmented image output sections of the respective image processing sections 301 to 316 output partial image data DIn1 to DIn16 subjected to the image processing to the video composition section 40 in parallel.

The video composition section 40 performs image composition processing which, for partial image data DIn1 to DIn16 received from the segmented image output sections in parallel, includes arrangement decision processing for sorting the arrangement of partial image data and rearranging image data so as to be displayed as display image data DIn0 when partial image data is displayed synchronously (Step S160). After the image composition processing, the video composition section 40 transmits partial image data to the video output section 50 (Step S170). The video output section 50 receives rearranged partial image data DIn1 to DIn16 from the video composition section 40 and synchronously outputs partial image data as an output signal to the liquid crystal panel driving section of the liquid crystal projector (Step S180). This image processing is repeatedly performed for input partial image data DIn1 to DIn16, such that the video processing apparatus 100 performs the image processing. With the above, the video processing in the 8K4K mode by the video processing apparatus 100 has been described.

A3 Ambient Pixel Data Exchange Processing

Figure 7:
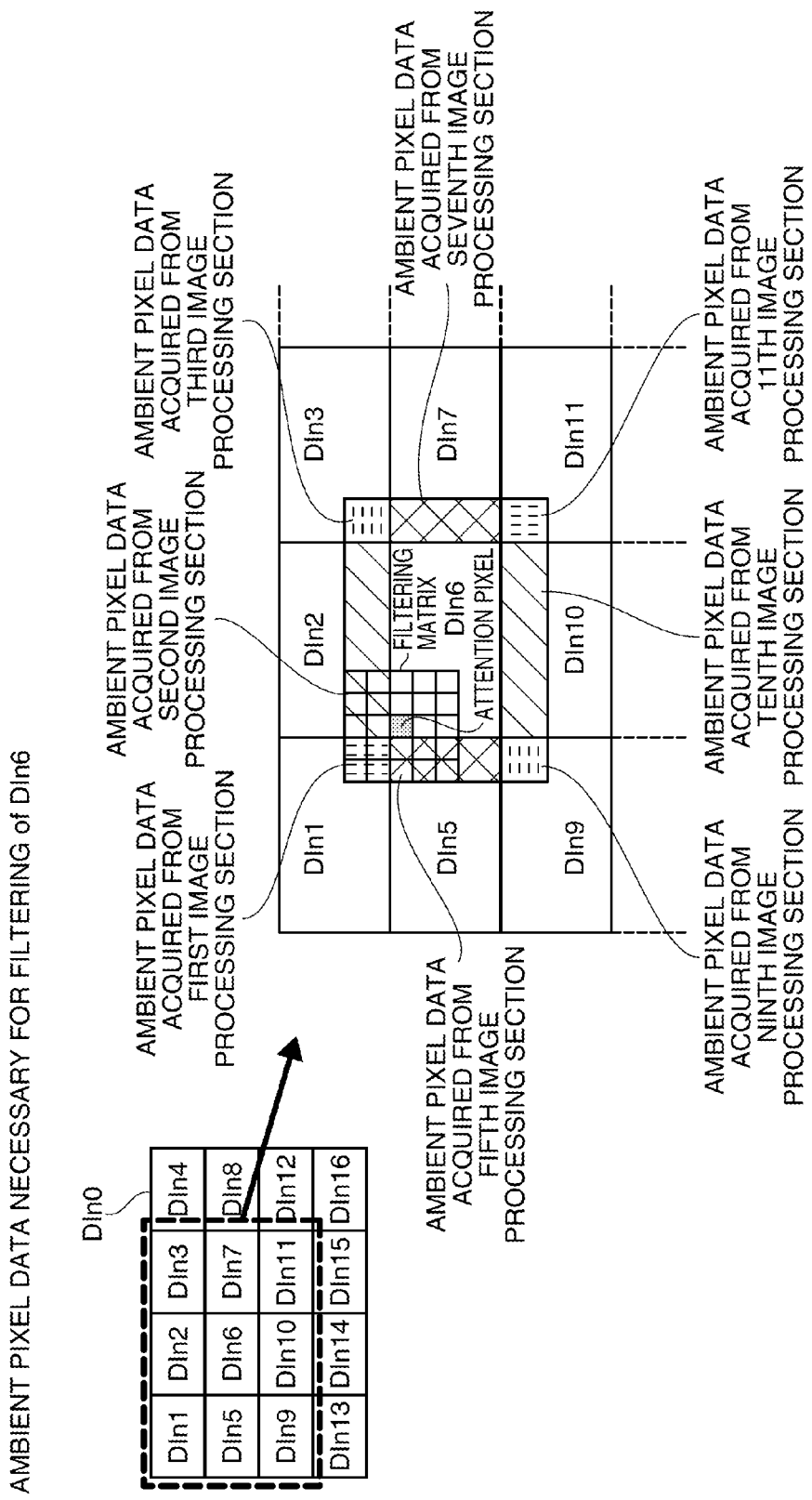
FIG. 7 is an explanatory view illustrating ambient pixel data conversion processing.

Next, the above-described ambient pixel data exchange processing (see FIG. 6: Step S140) will be described. First, ambient pixel data will be described. As a specific example, FIG. 7 is an explanatory view illustrating ambient pixel data which is necessary when the sixth image processing section 306 performs filtering of partial image data DIn6. By means of a filtering matrix of 5 rows×5 columns centered on pixels (hereinafter, also referred to as attention pixels) to be processed in partial image data DIn6, the filtering section 365 performs filtering for the attention pixels while referencing image data by two pixels around the attention pixels. Specifically, filtering is performed by a Laplacian filter or a median filter for edge enhancement or denoising, or a filter for image processing, such as a Kalman filter. In performing the filtering, when pixels inward of four sides (upper side, lower side, left side, and right side) in total on the upper and lower sides in the vertical direction and the left and right sides in the horizontal direction of partial image data DIn6 are to be processed as attention pixels by two pixels, pixels which are referenced for the filtering include pixels in partial image data DIn1 to DIn3, DIn5, DIn7, and DIn9 to DIn11 which are partial image data around partial image data DIn6. Thus, the sixth image processing section 306 has to acquire ambient pixel data shown in FIG. 7 as ambient pixel data from partial image data DIn1 to DIn3, DIn5, DIn7, and DIn9 to DIn11 around partial image data DIn6. The data exchange section 362 of the sixth image processing section 306 acquires ambient pixel data from the image processing sections 301 to 303, 305, 307, and 309 to 311, which input partial image data DIn1 to DIn3, DIn5, DIn7, and DIn9 to DIn11, through the bus 45 by the ambient pixel data exchange processing (see FIG. 6: Step S140). In this way, the ambient pixel data exchange processing is performed. After the ambient pixel data exchange processing, each image processing section performs filtering of partial image data DIn with reference to acquired ambient pixel data and outputs processed partial image data to the video composition section 40.

A4 Input Mode Change Processing

Figure 8:
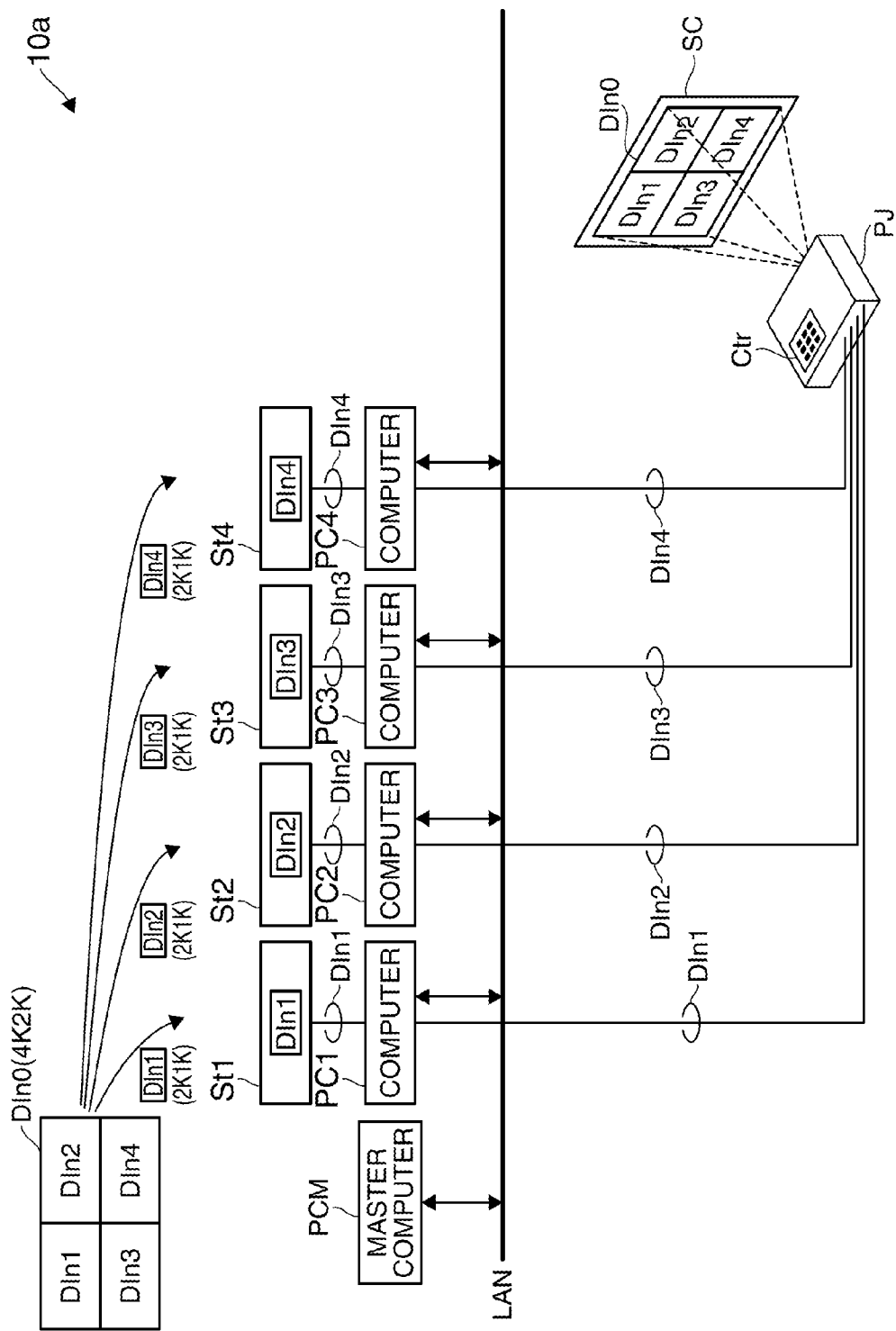
FIG. 8 is an explanatory view illustrating a video display system.

Next, input mode change processing which is performed to change the resolution of display image data DIn0 input to the projector PJ will be described. In the above-described video display system 10 (see FIG. 1), display image data DIn0 having a resolution of 8K4K is segmented into 2K1K partial image data DIn1 to DIn16 and partial image data DIn1 to DIn16 are respectively input to the image processing sections 301 to 316. Next, a case where display image data DIn0 is input while the resolution is changed to 4K2K is taken into consideration. This case is shown in FIG. 8. FIG. 8 is an explanatory view showing a video display system 10a when 4K2K data is input as display image data DIn0. The respective constituent elements of the video display system 10a are the same as those in the video display system 10, thus description thereof will be omitted. There is a difference in that the number of computers connected to the projector PJ are four computers PC1 to PC4, the number of video storages are four video storages St1 to St4, and the resolution of DIn0 is changed from 8K4K to 4K2K. Since display image data DIn0 is 4K2K, in this case, four pieces of 2K1K partial image data, that is, DIn1 to DIn4 are input to the projector PJ. DIn1 to DIn4 are sequentially input from the video storages St1 to St4 to the projector PJ through the computers PC1 to PC4.

Figure 9:
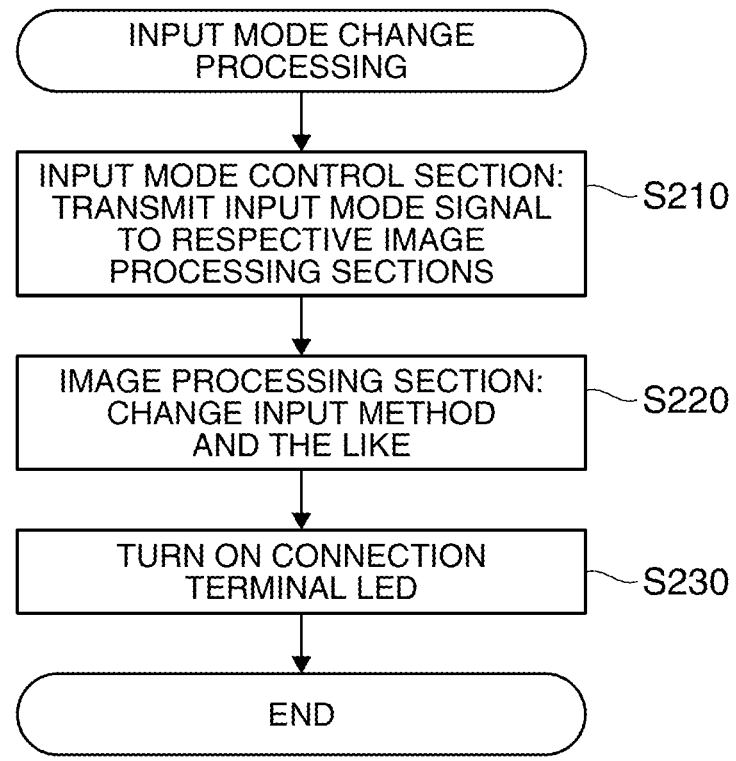
FIG. 9 is an explanatory view illustrating the flow of input mode change processing.

The user carries out change setting of the input mode from the manipulation section Ctr of the projector PJ in accordance with the change of the input mode. FIG. 9 is an explanatory view illustrating the flow of input mode change processing in the projector PJ when the input mode is changed. If the user changes the input mode through the manipulation section Ctr, the input mode control section 65 transmits an input mode signal according to the input mode set by the user to the data distribution control section (see FIG. 5) in each image processing section (Step S210). If the input mode signal is received, the data distribution control section of each image processing section changes an input method and a processing method of partial image data DIn input to each image processing section (Step S220). The details of the changed input method and processing method of partial image data will be described below in detail. Thereafter, the input mode control section 65 turns on the LED 24 in the connection terminal 25, which connects the projector PJ and the corresponding computer to each other, through the LED/IF 23 (Step S230). The LED 24 is an LED which informs the user of to which of the 16 connection terminals 25 of the projector PJ the computers PC1 to PC4 will be connected. In this example, in the case of the 4K2K mode, the LEDs 24 of the connection terminals corresponding to the video input sections 201, 203, 209, and 211 are turned on. The reason why the LEDs 24 are turned on irregularly will be described below.

The user confirms the turned-on LEDs 24 and connects the computers PC1 to PC4 to the connection terminals 25 (the connection terminals corresponding to the video input sections 201, 203, 209, and 211) with the LEDs 24 turned on. Thereafter, if the user issues an instruction to start video display through the master computer PCM, partial image data DIn1 to DIn4 are input from the video storages St1 to St4 to the projector PJ. As described above, the resolution of partial image data DIn1 to DIn4 is 2K1K.

Figure 10A:
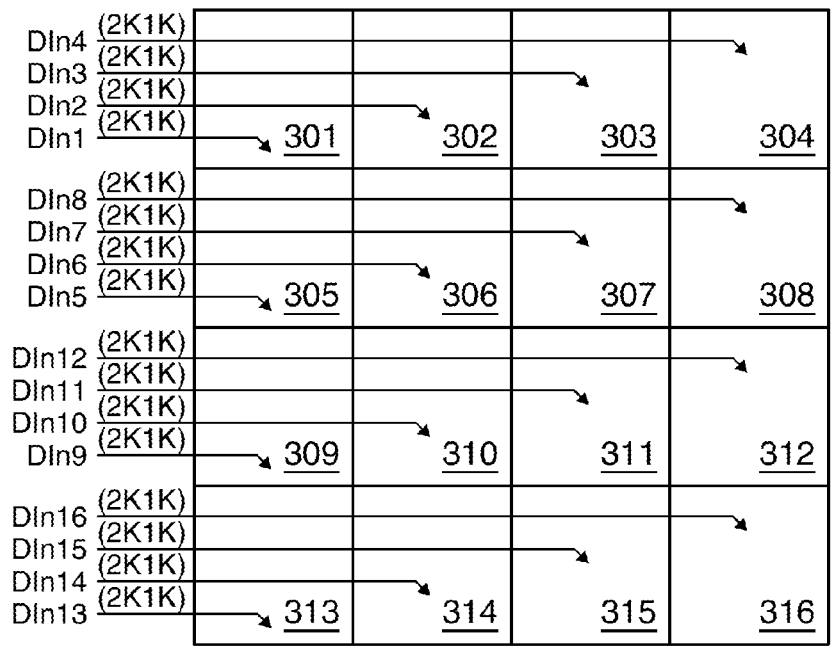
FIGS. 10A and 10B are explanatory views illustrating an input method and a processing method of partial image data when an input mode is changed.
Figure 10B:
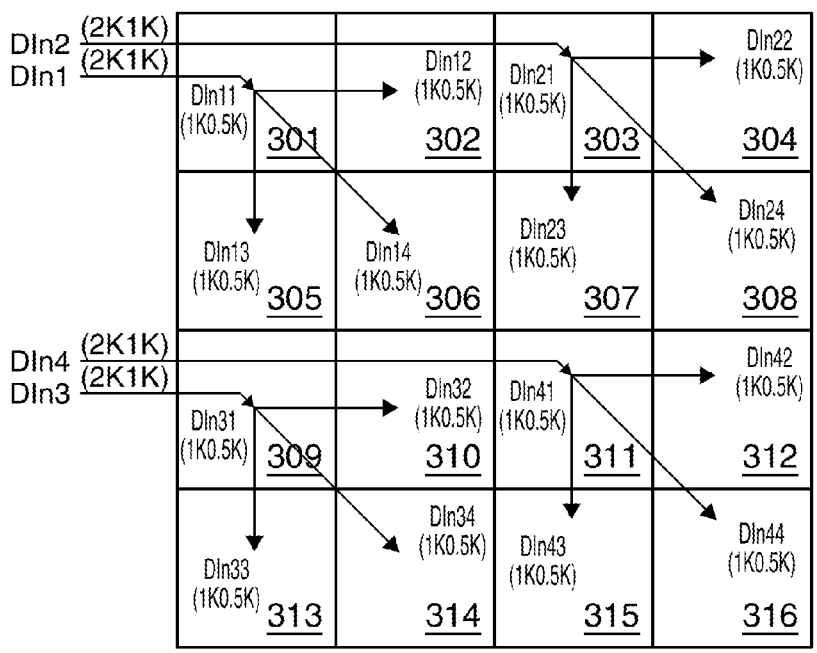

Next, the input method and processing method of partial image data in the respective image processing sections along with the input of partial image data DIn1 to DIn4 to the projector PJ will be described. FIGS. 10A and 10B are explanatory views illustrating the input method and processing method of partial image data DIn1 to DIn4 which are changed with the change of the input mode. In comparison with the input method and processing method in the 8K4K mode, FIG. 10A is an explanatory view illustrating the input method and processing method in the 8K4K mode, and FIG. 10B is an explanatory view illustrating the input method and the processing method in the 4K2K mode. First, the input method and processing method of partial image data DIn in the 8K4K mode as a comparative example will be described with reference to FIG. 10A.

In the 8K4K mode, as described in the video display system 10 (see FIG. 1), partial image data DIn1 to DIn16 are respectively input from the computers PC1 to PC16 to the image processing sections 301 to 316 through the video input sections 201 to 216. FIG. 10A shows this case. For ease of understanding, the image processing sections 301 to 316 are shown in a matrix. At this time, the resolution of DIn1 to DIn16 input to the image processing sections 301 to 316 is 2K1K.

In contrast, FIG. 10B shows a case where the input mode is changed to the 4K2K mode. In the 4K2K mode, as described in the video display system 10a of FIG. 8, DIn1 to DIn4 are input from the computers PC1 to PC4 to the projector PJ. At this time, the user connects the computer PC1 to the video input section 201, the computer PC2 to the video input section 203, the computer PC3 to the video input section 209, and the computer PC4 to the video input section 211 with the change of the input mode. Thus, 2K1K partial image data DIn1 to DIn4 are respectively input to the image processing sections 301, 303, 309, and 311. Input 2K1K partial image data DIn1 to DIn4 are respectively segmented into four pieces of image data. As shown in FIG. 10B, three pieces of image data from among segmented partial images are distributed to the respective image processing sections so as to be adjacent to each other when arranged as display image data DIn0 (hereinafter, also referred to as distribution processing).

Specific description will be provided as to DIn1 input to the first image processing section 301 as an example. If DIn1 is input to the first image processing section 301, DIn1 is temporarily stored in the frame memory through the segmented video input section (see FIG. 5) in the first image processing section 301. Thereafter, DIn1 is segmented into four pieces of partial image data by the data distribution control section. Thereafter, four pieces of data are also referred to as segmented partial image data DIn11, DIn12, DIn13, and DIn14 (see FIG. 10B). The four pieces of segmented partial image data are obtained by bisecting (in total, quartering) partial image data DIn1 having the resolution of 2K1K in the vertical and horizontal directions. Thus, the resolution of each piece of segmented partial image data is "1K0.5K". Then, in correspondence with the arrangement relationship of segmented partial image data in display image data DIn0, DIn11 is reserved in the first image processing section 301, and DIn12, DIn13, and DIn14 are respectively distributed to the second image processing section 302, the third image processing section 303, and the fourth image processing section 304. The distribution is done such that the data distribution control section transmits segmented partial image data to the image processing sections 302, 305, and 306 through the bus 45 (see FIG. 3) which connects the image processing sections 301 to 316 to each other.

The distribution processing which has been described as to DIn1 input to the first image processing section 301 as an example is similarly performed for partial image data DIn2 input to the third image processing section 303, partial image data DIn3 input to the ninth image processing section 309, and partial image data DIn4 input to the 11th image processing section 311. That is, partial image data DIn1 to DIn4 are further segmented into four pieces of partial image data, and four pieces of partial image data are distributed to other image processing sections. Thus, even when the resolution of input display image data DIn0 is low, image processing is performed using all the image processing sections. In performing the image processing, the computers PC1 to PC4 are respectively connected to the image processing sections 301, 303, 309, and 311. For this reason, in Step S230 of FIG. 9 described above, the input mode control section 65 turns on the LEDs in the connection terminals (in this example, the connection terminals corresponding to the video input sections 201, 203, 209, and 211) which connect the projector PJ and the computers to each other.

Next, the image processing in each image processing section including the above-described distribution processing will be described with reference to a flowchart. The processing may be divided into processing by the image processing sections 301, 303, 309, and 311 (hereinafter, also referred to as main image processing sections) which directly receive partial image data DIn1 to DIn4 from the computers PC1 to PC4 and processing by the image processing sections (hereinafter, also referred to as sub image processing sections), which receive segmented partial image data from the main image processing sections, other than the image processing sections 301, 303, 309, and 311.

FIG. 11 is a flowchart illustrating the flow of image processing by the main image processing sections and the flow of image processing by the sub image processing sections. (A) in FIG. 11 shows the flow of image processing by the main image processing sections, and (B) in FIG. 11 shows the flow of image processing by the sub image processing sections. The image processing by the main image processing sections starts when partial image data DIn1 to DIn4 are respectively input from the computers PC1 to PC4. If partial image data is input to each main image processing section (Step S310), the CPU of the main image processing section stores partial image data in the frame memory through the segmented video input section (see FIG. 5) and segments partial image data into four pieces of segmented partial image data by the data distribution control section (Step S320). Thereafter, the CPU distributes three pieces of segmented partial image data from among segmented partial image data to the sub image processing sections (Step S330). After the distribution processing, the CPU of the main image processing section performs ambient pixel data exchange processing between segmented partial image data reserved in the frame memory and segmented partial image data reserved or distributed in other image processing section (Step S340). After the exchange of ambient pixel data, filtering of segmented partial image data is performed using pixel data (Step S350). After the filtering, in order to adjust 4K2K image data to the size of the display image in the 8K4K mode, resolution conversion processing is performed for expanding the resolution two times (Step S360). As the resolution conversion processing, pixel interpolation processing which has been generally used is performed. Specifically, bi-cubic convolution, bilinear interpolation, or the like is used. After the resolution conversion processing, image data is output to the video composition section 40 (Step S370). In this way, the image processing by the main image processing sections ends.

Meanwhile, in the sub image processing sections ((B) in FIG. 11), the image processing starts simultaneously when the main image processing sections receive partial image data and is in the standby state until the segmented partial image data is received from the main image processing sections (Step S430). If segmented partial image data is received from the main image processing sections (Step S430: YES), segmented partial image data is temporarily stored in the frame memories through the data distribution control section (Step S435). After segmented partial image data is stored in the frame memories, ambient pixel data exchange processing is performed between segmented partial image data and segmented partial image data reserved or distributed in other image processing sections (Step S440). After the exchange of ambient pixel data, filtering of segmented partial image data is performed using pixel data (Step S450). After the filtering, the above-described resolution conversion is performed (Step S460). Thereafter, segmented partial image data subjected to the resolution conversion is output to the video composition section 40 (Step S410). In this way, the image processing by the sub image processing section ends.

The video composition section 40 receives segmented partial image data transmitted from the main image processing sections ((A) in FIG. 11: Step S370) and segmented partial image data transmitted from the sub image processing sections ( )B) in FIG. 11: Step S470), sorts the arrangement of segmented partial image data, and performs image composition processing including arrangement decision processing for rearranging image data such that segmented partial image data is displayed as display image data DIn0 when synchronously displayed (see FIG. 6: Step S160). The subsequent processing by the video processing apparatus 100 is the same as the processing after Step S170 of FIG. 6, thus description thereof will be omitted. In this way, when the input mode is changed from the 8K4K mode to the 4K2K mode, the respective image processing sections change the data input method and processing method.

Figure 12:
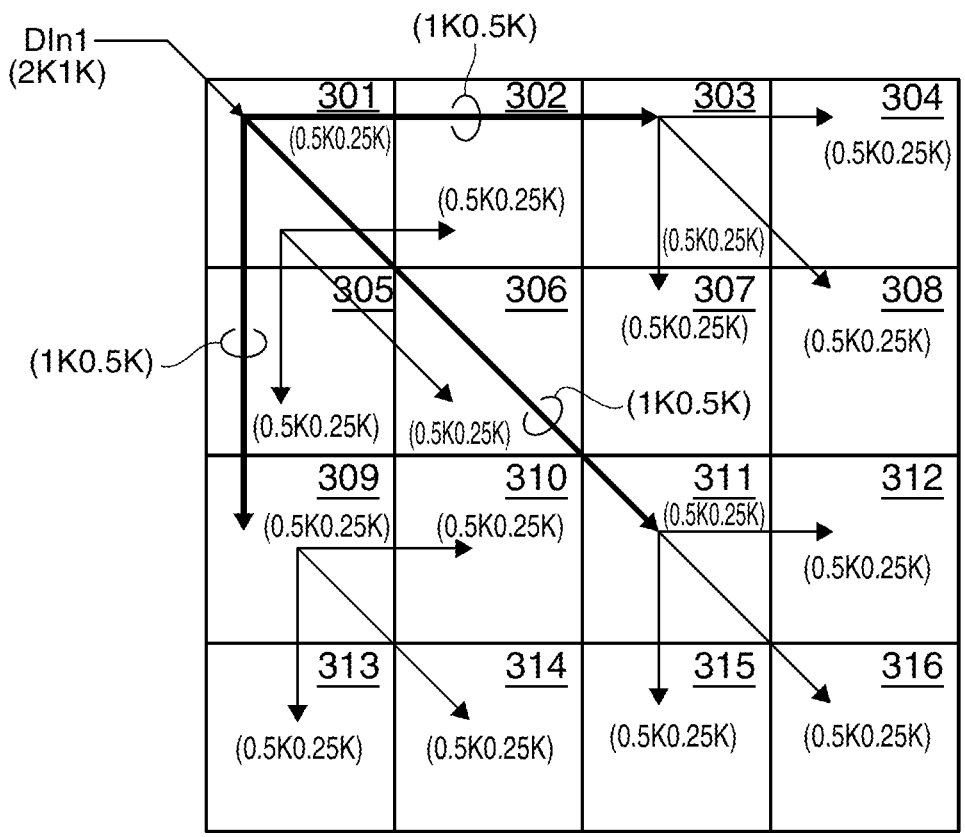
FIG. 12 is an explanatory view illustrating an input method and a processing method of partial image data when an input mode is changed to a 2K1K mode.

Next, description will be provided as to the input method and processing method of image data when the input mode is the 2K1K mode, that is, when the resolution of image data of display image data DIn0 is 2K1K. FIG. 12 is an explanatory view illustrating the input method and processing method of partial image data which are changed with the change to the 2K1K mode. When the resolution of display image data DIn0 is 2K1K, 2K1K partial image data DIn1 is input from the computer PC1 to the first image processing section 301. That is, with the change of the input mode by the user using the manipulation section Ctr, in the above-described input mode change processing of the projector PJ (see FIG. 9), the LED of the connection terminal corresponding to the first image processing section 301 from among the LEDs of the connection terminals is turned on (see FIG. 9: Step S230). The user confirms that the LED is turned on and connects the computer PC1 and the video input section 201 (see FIG. 3) of the projector PJ. Thereafter, the user issues an instruction to start display through the master computer PCM. The subsequent processing is the same as in the above-described 4K2K mode, except for the distribution method of partial image data DIn1, thus description will be provided as to the distribution method of partial image data DIn1 in the 2K1K mode.

As shown in FIG. 12, partial image data DIn1 having the resolution of 2K1K is input from the computer PC1 to the first image processing section 301. The CPU of the first image processing section 301 temporarily stores input partial image data DIn1 in the frame memory, and the data distribution control section of the first image processing section 301 segments partial image data DIn1 into four pieces of segmented partial image data. Then, three pieces of segmented partial image data from among the four pieces of segmented partial image data are respectively distributed to the image processing sections 303, 309, and 311. That is, in this processing step, each of the image processing sections 301, 303, 309, and 311 respectively store one piece of segmented partial image data in the corresponding frame memory (see FIG. 5). Thereafter, the data distribution control section of each of the four image processing sections further segments segmented partial image data stored in the corresponding frame memory into four pieces of image data. Thereafter, as shown in FIG. 12, image data (hereinafter, also referred to as two-step segmented image data) obtained by further quartering segmented partial image data is distributed to the respective image processing sections. That is, in the 2K1K mode, image data is distributed in two steps. The subsequent image processing is the same as in the 4K2K mode, thus description thereof will be omitted. In this way, in the 2K1K mode, the image processing sections execute the input and processing of image data.

As described above, in the projector PJ of this example, regardless of whether the resolution of display image data DIn0 is high or low, image data is distributed to all the image processing sections, and the image processing is performed in all the image processing sections. When display image data DIn0 has low resolution (in this example, 4K2K and 2K1K), the processing in the image processing sections includes the resolution conversion processing (see (A) in FIG. 11: Step S360 and Step S460). The resolution conversion processing which is pixel interpolation processing, such as bi-cubic convolution or bilinear interpolation, imposes a heavy load on the image processing sections. In this example, even when display image data DIn0 having low resolution is input, image data is distributed to and processed in the image processing sections, such that the processing which imposes a heavy load is distributed in the image processing sections and performed in parallel. Thus, in this example, the projector PJ can reduce the specification and performance of hardware resources necessary for the image processing sections and can consequently achieve reduction in cost compared to a projector in which the number of image processing sections for use in processing is changed depending on the resolution of input display image data DIn0, for example, a projector in which, in the 8K4K mode, processing is performed by 16 image processing sections and, in the 4K2K mode, processing is performed by four image processing sections depending on the ratio of lowering of resolution. Even when the input mode is changed and the resolution of display image data DIn0 input to the projector PJ is changed, output is made to the video composition section 40 after the resolution conversion in the image processing sections. Thus, the video composition section 40 can perform the same processing even when the input mode is changed, and it is not necessary that the video composition section 40 includes a processing unit for each input mode.

As the correspondence relationship with the appended claims, the video processing apparatus 100 corresponds to an image processing apparatus described in the appended claims, the resolution 8K4K corresponds to a reference resolution P described in the appended claims, and the resolution 4K2K and 2K1K correspond to a low resolution Q described in the appended claims. In the 4K2K mode, the main image processing section and the sub image processing section correspond to a first image processing section and a second image processing section described in the appended claims.

In the 2K1K mode, the image processing section which inputs partial image data DIn1 corresponds to a first image processing section described in the appended claims, and the image processing section which receives segmented partial image data from other image processing sections correspond to a second image processing section described in the appended claims, and the image processing section which receives two-step segmented image data from other image processing sections corresponds to a third image processing section described in the appended claims. In each input mode, the video input section connected to the computer PC corresponds to an input section described in the appended claims.

B Modification

The invention is not limited to the above-described examples or embodiment, and may be carried out in various aspects without departing from the scope of the invention. For example, the following modifications may be made.

B1 Modification 1

In the above-described example, for example, the projector PJ inputs 2K1K partial images as 16 pieces of partial image data DIn1 to DIn16 in the 8K4K mode and inputs 2K1K partial image data as four pieces of partial image data DIn1 to DIn4 in the 4K2K mode. That is, although a case has been described where the resolution of one piece of partial image data DIn is 2K1K, the invention is not limited thereto. For example, the resolution of one piece of partial image data DIn may be arbitrarily used in the segmentable range of display image data DIn0 such that the resolution of one piece of partial image data DIn is "1K1K", "1K0.5K", or the like.

B2 Modification 2

Although in the above-described example, the projector PJ performs the distribution processing of input partial image data DIn without depending on the resolution of display image data DIn0, and the image processing is performed in all the image processing sections, the invention is not limited thereto. For example, in the 4K2K mode, input partial image data DIn may be processed in 12, 8, or 6 image processing sections in a distributed manner. That is, instead of decreasing the number of image processing sections to be used depending on the ratio of lowering of resolution of display image data DIn0 to a predetermined resolution (in this example, 8K4K) as a reference, display image data DIn0 is processed by using a larger number of image processing sections than "the number of image processing sections according to the ratio of lowering of resolution". Therefore, it is possible to reduce the specification and performance of hardware resources necessary for the respective image processing sections compared to a projector in which the number of image processing sections to be used in processing decreases depending on the ratio of lowering of the resolution of input display image data DIn0.

B3 Modification 3

Figure 13:
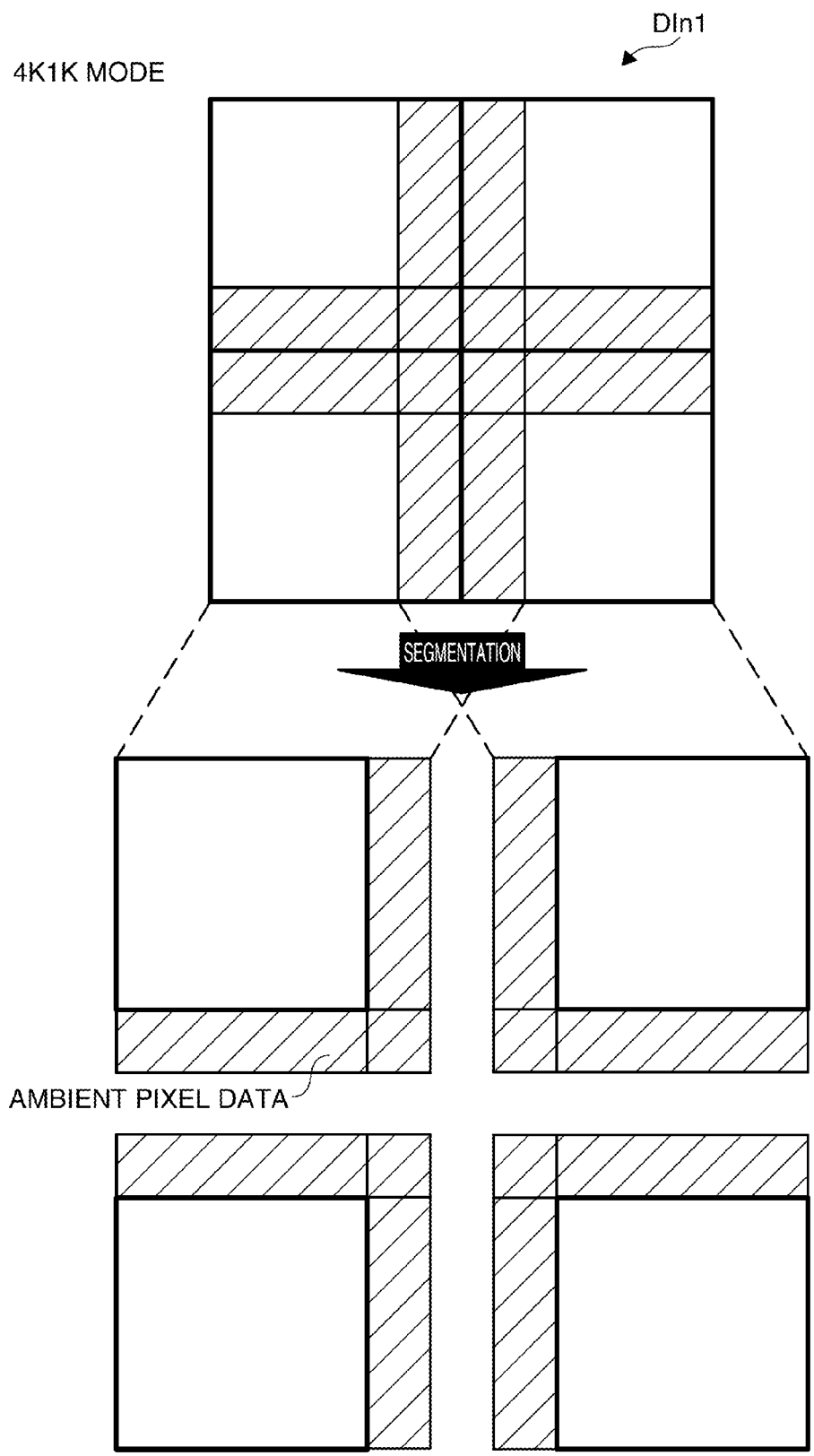
FIG. 13 is an explanatory view illustrating Modification 3.

Although in the above-described example, for example, in the 4K2K mode, 2K1K partial image data DIn is input to the four main image processing sections, two-step segmented image data is distributed from the main image processing sections to the sub image processing sections, and after ambient pixel data exchange processing between the image processing sections, filtering and resolution conversion are performed, in Modification 3, the processing sequence may be changed. For example, in the 4K2K mode, after partial image data DIn1 to 4 are input to the main image processing sections (image processing sections 301, 303, 309, and 311), ambient pixel data exchange processing may be performed between the main image processing sections, filtering may be then performed, and subsequently partial image data may be segmented into two-step segmented image data and distributed to the sub image processing sections. Thereafter, two-step segmented image data is subjected to resolution conversion in the image processing sections and output to the video composition section 40. If this processing sequence is used, the image processing sections which perform the ambient pixel data exchange processing may be limited to the main image processing sections. Even through this processing, the same effects as in the above-described example can be obtained. In the 4K2K mode and the 2K1K mode, before input partial image data DIn is segmented, input partial image data may be segmented in the form including ambient pixels necessary for processing segmented partial image data and two-step segmented image data. This example is shown in FIG. 13. As shown in FIG. 13, for example, in the 4K2K mode, when partial image data DIn1 input to the image processing section 301 is quartered, instead of simply segmenting partial image data into four pieces of image data, partial image data is segmented so as to include ambient pixels. If partial image data is segmented in this manner, it is possible to reduce ambient pixel data exchange processing. Even through this processing, the same effects as in the above-described example can be obtained.

B4 Modification 4

Although in the above-described example, this image processing method is used in the projector PJ, the invention is not limited thereto. This image processing method can be applied to an image display apparatus which displays image data as images, such as a liquid crystal television, a plasma television, an organic EL display, or an electronic paper. The video processing apparatus 100 may be separated from the projector or other video display apparatuses, or may be incorporated into the video display system. The video processing apparatus may be separated from the video display apparatus, video data output from the video processing apparatus may be output to a plurality of video display apparatus in a state of being segmented into multiple pieces of data, and display images displayed by the video display apparatuses may be displayed on a display surface in a unified manner. For example, display image data DIn0 subjected to video processing from the video processing apparatus is segmented into four pieces of image data, and respective pieces of segmented image data are input to four projectors. The projectors project and display the segmented images on the single screen SC so as to be displayed as a single display image on the screen SC in a unified manner.

What is claimed is:

1. An image processing apparatus which processes image data corresponding to a display image, the image processing apparatus comprising:
    an input section which is configured to input at least image data corresponding to an image having a reference resolution P which is a resolution as a reference, the resolution representing the number of constituent pixels;
    M image processing sections which have a function of processing image data of M (where M is an integer equal to or greater than 2) images segmented from the image having the reference resolution P;
    an image processing control section which, when an image corresponding to input image data is the image having the reference resolution P, causes the M image processing sections to process image data corresponding to the M partial images segmented from image data and, when an image corresponding to input image data is an image which has a resolution Q lower than the reference resolution P and is of size to be processable by N (where N is an integer equal to or smaller than M−1) image processing sections, causes L image processing sections from among the M image processing sections to process image data corresponding to L (where L is an integer equal to or greater than N+1 and equal to or smaller than M) partial images segmented from image data; and
    an image composition section which reconstructs the display image on the basis of image data corresponding to the partial images subjected to image processing by the M or L image processing sections.

2. The image processing apparatus according to claim 1, wherein a plurality of input sections are provided to input image data corresponding to the display image as multiple pieces of segmented image data.

3. A projection display apparatus which projects a projected image on a projection surface on the basis of image data corresponding to a display image, the projection display apparatus comprising:
    the image processing apparatus according to claim 2.

4. A video display system comprising:
    a video display apparatus which includes the image processing apparatus according to claim 2 and displays an image on the basis of image data corresponding to a display image; and
    a storage which stores image data corresponding to the display image and inputs image data corresponding to the display image to the video display apparatus.

5. The image processing apparatus according to claim 1, wherein the L image processing sections include
a first image processing section which, before the image processing, receives image data input by the input section, segments received image data into a predetermined number of pieces of image data, reserves at least one piece of segmented image data for use in processing, and distributes unreserved segmented image data to other image processing section, and
a second image processing section which receives image data distributed by the first image processing section.

6. The image processing apparatus according to claim 5, wherein the second image processing section segments image data received from the first processing section into a predetermined number of pieces of image data, reserves at least one piece of segmented image data for use in processing, and distributes unreserved segmented image data to image processing sections other than the first and second image processing sections, and
the L image processing sections include a third image processing section which receives image data distributed by the second image processing section.

7. A projection display apparatus which projects a projected image on a projection surface on the basis of image data corresponding to a display image, the projection display apparatus comprising:
the image processing apparatus according to claim 6.

8. A video display system comprising:
a video display apparatus which includes the image processing apparatus according to claim 6 and displays an image on the basis of image data corresponding to a display image; and
a storage which stores image data corresponding to the display image and inputs image data corresponding to the display image to the video display apparatus.

9. A projection display apparatus which projects a projected image on a projection surface on the basis of image data corresponding to a display image, the projection display apparatus comprising:
the image processing apparatus according to claim 5.

10. A video display system comprising:
a video display apparatus which includes the image processing apparatus according to claim 5 and displays an image on the basis of image data corresponding to a display image; and
a storage which stores image data corresponding to the display image and inputs image data corresponding to the display image to the video display apparatus.

11. The image processing apparatus according to claim 1, wherein M and L are the same number.

12. A projection display apparatus which projects a projected image on a projection surface on the basis of image data corresponding to a display image, the projection display apparatus comprising:
the image processing apparatus according to claim 11.

13. A video display system comprising:
a video display apparatus which includes the image processing apparatus according to claim 11 and displays an image on the basis of image data corresponding to a display image; and
a storage which stores image data corresponding to the display image and inputs image data corresponding to the display image to the video display apparatus.

14. A projection display apparatus which projects a projected image on a projection surface on the basis of image data corresponding to a display image, the projection display apparatus comprising:
the image processing apparatus according to claim 1.

15. A video display system comprising:
a video display apparatus which includes the image processing apparatus according to claim 1 and displays an image on the basis of image data corresponding to a display image; and
a storage which stores image data corresponding to the display image and inputs image data corresponding to the display image to the video display apparatus.

16. An image processing method which processes image data corresponding to a display image and processes at least image data corresponding to an image having a reference resolution P which is a resolution as a reference, the resolution representing the number of constituent pixels, the image processing method comprising:
when image data corresponding to the input display image is the image having the reference resolution P, segmenting image data into image data corresponding to M (where M is an integer equal to or greater than 2) partial images having a resolution R and processing segmented image data in parallel;
when image data corresponding to the input display image has a resolution Q lower than the reference resolution P, and one of N (where N is an integer equal to or smaller than M−1) segmented partial images has a resolution equal to or lower than a resolution R, segmenting image data into L (where L is an integer equal to or greater than N+1 and equal to or smaller than M) pieces of image data and processing image data corresponding to the partial images in parallel; and
reconstructing the display image on the basis of processed image data corresponding to the M or L partial images.

17. A computer readable storage medium storing a computer program which causes a computer to realize an image processing function of processing image data corresponding to a display image and processing at least image data corresponding to an image having a reference resolution P which is a resolution as a reference, the resolution representing the number of constituent pixels, the computer program causing the computer to execute:
when image data corresponding to the input display image is the image having the reference resolution P, segmenting image data into image data corresponding to M (where M is an integer equal to or greater than 2) partial images having a resolution R and processing segmented image data in parallel;
when image data corresponding to the input display image has a resolution Q lower than the reference resolution P, and one of N (where N is an integer equal to or smaller than M−1) segmented partial images has a resolution equal to or lower than a resolution R, segmenting image data into L (where L is an integer equal to or greater than N+1 and equal to or smaller than M) pieces of image data and processing image data corresponding to the partial images in parallel; and
reconstructing the display image on the basis of processed image data corresponding to the M or L partial images.

* * * * *